[3,150,011]

SHAPED METAL PARTS HAVING A SUPERFICIAL DOUBLE SKELETON CATALYST STRUCTURE

August Winsel and Eduard Justi, Braunschweig, Germany, assignors, by mesne assignments, to Varta Aktiengesellschaft and Siemens-Schuckert-Werke Aktiengesellschaft
No Drawing. Filed Mar. 2, 1959, Ser. No. 796,713
Claims priority, application Germany Mar. 5, 1958
16 Claims. (Cl. 136—120)

This invention relates to shaped metal parts having a superficial double skeleton catalyst structure, and more particularly to a process for producing such structures.

It is well known that double skeleton catalyst electrodes of high mechanical strength and high metal, thermal and electrical conductivity can be conventionally prepared. These electrodes usually consist of a carrier skeleton having metallic conduction with Raney metal granules embedded therein.

For example, highly active hydrogen diffusion electrodes may be obtained by a procedure wherein a Raney nickel alloy consisting of 60% by weight of aluminum and 40% by weight of nickel are ground to form a fine powder and mixed with carbonyl nickel powder in a ratio by volume of about 1:2. The mixture is pressed in molds under a pressure of 3000 to 7000 kg./cm.$^2$ to obtain the shape desired and the shaped part is sintered for about 30 minutes at 700° C. in a reducing atmosphere. Thereafter, the aluminum is dissolved out of the Raney nickel alloy by means of a concentrated caustic potash solution. These hydrogen electrodes, with very low polarizations (<50 mv.), supply current densities of more than 200 ma./cm.$^2$ at temperatures even as low as room temperature.

Moreover, double skeleton catalyst electrodes containing from 1 to 80% by weight of Raney silver embedded in an electrically conductive carrier skeleton have been proposed as well. These electrodes have a high catalytic activity and are particularly useful as gas diffusion electrodes for the oxidizing gas in fuel cells and also as cathodes in electrolyzers.

The activation of Raney catalysts and of parts containing Raney metals can be conveniently effected if the potential of the starting Raney metal is maintained more positive than the reversible hydrogen potential which prevails in the activation solution, especially under atmospheric pressure. By working in this manner, it is possible to adjust and obtain a desired degree of activity.

As mentioned above, these double skeleton catalyst electrodes are particularly suitable as gas diffusion electrodes for fuel cells. In addition, their use in electrolyzers offers many advantages since the low hydrogen overvoltage, particularly in the case of nickel double skeleton catalyst electrodes, and the low O$_2$ overvoltage, particularly in the case of double skeleton catalyst electrodes containing Raney silver, result in a great saving of energy.

On the other hand, there are certain obvious disadvantages and deficiencies connected with the operation of double skeleton catalyst electrodes. Among these is the high investment required, which has discouraged widespread industrial acceptance of such electrodes for use in electrolyzers.

Another disadvantage of double skeleton catalyst electrodes of previous design resides in the fact that they are very sensitive to bending stresses due to their high degree of brittleness and, therefore, cannot be further worked up or changed in shape after their production except by simple drilling, cutting, and grinding.

It was found, nevertheless, by varying the electrode thickness that, in electrolysis, using a nickel double skeleton catalyst electrode, only a superficial layer of about 0.3 mm. thickness of the electrode actually takes part in the evolution of hydrogen. Accordingly, the use of electrodes thicker than about 0.3 mm. is no longer necessary and results in unwarranted investment expense. However, the use of these thinner double skeleton catalyst electrodes having thicknesses below about 1 mm. are undesirable and impractical because the mechanical strength of the electrodes so formed is insufficient for the intended use.

It is an object of the present invention to overcome the above mentioned drawbacks and to provide shaped metal parts which combine the mechanical properties of solid pure metals or alloys with the catalytic properties, particularly electrochemical activity, of conventional double skeleton catalyst electrodes.

Other and further objects of the invention will become apparent from a study of the within specification.

It has been found, in accordance with the invention, that these objects may be achieved by providing shaped metallic parts which have a base structure on which a superficial catalyst layer is disposed. Such shaped parts may be preferably used as electrodes in fuel cells, electrolyzers, etc. The surface of the solid or porous metallic base may be of any desired shape. This surface is completely or partially coated by a double skeleton catalyst layer comprising an electrically conductive carrier skeleton having Raney skeleton granules embedded therein. The basic material for processing this superficial double skeleton catalyst layer may comprise from 1 to 95% by weight of a Raney alloy with from 99 to 5% by weight of supporting skeleton material and preferably from 20 to 80% by weight of Raney alloy with from 80 to 20% by weight of supporting skeleton material.

Suitable shaped metallic parts which are contemplated by the invention include foils, plates, wires and wire gauzes of any shape or arrangement, e.g. rings, cylinders, circular or polygonal discs, the particular configuration depending upon the intended use. In general, these parts may comprise solid metal but they may also have a predetermined porosity, i.e. they may be made of a sintered metal or the like.

According to conventional procedures, a catalyst for the oxidation of ethylene can be prepared by applying an alloy of silver and an alkaline earth metal to a metallic substrate by means of welding without preheating or by alloying and subsequently activating the formed structure. However, if, for example, a nickel-aluminum alloy is applied to a nickel substrate by this process, a Raney nickel coating having a thickness of a few atom layers only will adhere to the substrate after subsequent activation by dissolving out the aluminum, since the lattice of the alloy breaks down during the activation.

By applying a double catalyst structure in accordance with the process of the invention, on the other hand, it is possible to anchor a thicker coating of active Raney metal to the surface of the metal substrate. This surface layer double skeleton structure, therefore, constitutes a substantially distinctive feature of the structure of the invention as compared with the formation of the conventional catalyst as mentioned above.

While double skeleton catalyst electrodes having thicknesses below about 1 mm. were impractical since they lacked sufficient mechanical strength, in accordance with the present invention, by using a base structure onto which a double skeleton catalyst electrode layer may be disposed, thickness of from about 0.1 to 0.3 mm. may be used with complete success. A durable, efficient and inexpensive catalyst electrode is, therefore, now made available.

Generally, the metallic solid bodies which may be made in accordance with the invention preferably comprise at least one metal of Group 8 and Subgroups 1, 4, 5, 6, 7 of the Periodic Table of Elements either alone or as an alloy containing one or more of these same metals.

The supporting base skeleton for the superficial double skeleton layer may comprise at least one metal of Group 8 or the Subgroups of the Periodic Table, preferably Subgroups 1, 4, 5, 6, or 7, or an alloy containing one or more of these same elements.

The Raney metal used may be a metal of Group 8 or a metal of the Subgroups of the Periodic Table of Elements, preferably Subgroups 1, 4, 5, 6 or 7, which, if desired, may contain one or more activating additives such as other metals or compounds in a total amount not in excess of 50% by weight and preferably not in excess of 20% by weight.

The composite members are produced by coating the surface of the solid or porous metallic base substrate with a porous supporting skeleton tightly bonded thereto, and further embedding in said skeleton and tightly bonding thereto the alloy serving as the starting material for the production of the Raney skeleton granules. The composite member so formed is subsequently treated with an alkaline solution or an acid to dissolve out the soluble components of the Raney alloy.

Various methods may be applied for producing the composite parts. Thus, one method comprises the steps of applying to the surface of the metal base a mixture consisting of 99 to 5% by weight of said pulverulent supporting skeleton material and 1 to 95% by weight of said pulverulent Raney alloy, said application being effected by pressing or rolling, sintering the composite part at temperatures in excess of 400° C., and subsequently treating it with a caustic solution or acid to dissolve out the soluble component of the Raney alloy.

A further method comprises applying a coating of the supporting seleton material alone to the surface of the metallic substrate by pressing or rolling, then sintering the composite member. The Raney alloy may then be incorporated into the pores of the composite member by again pressing or rolling, sintering the body at temperatures above 400° C., and removing the soluble component of the Raney-alloy in the manner described above.

To obtain as high a porosity of the supporting skeleton layer as possible, the pulverulent starting material therefor may be mixed with a pore-forming material which is solid at room temperature but volatile at the sintering temperature, and is accordingly removed by the sintering operation. Among the pore-forming materials which may be used are: finely divided citric acid, oxalic acid, ammonium carbonate or any other inorganic or substance which, at or below the sintering temperature, evaporates or is decomposed without leaving behind a residue.

The sintering temperature is dependent upon the particular skeleton and Raney metals to be processed, temperatures of between 600 and 1100° C. being generally favorable and sufficient although temperatures between 300° and 1100° C. may be used.

A porous supporting skeleton layer comprising the same metal as that of the substrate may also be produced as, for instance, by conventional pore-forming treatment of the surface of the metallic base. This may be accomplished in a variety of ways, such as by etching with acids or caustic solutions, by partial oxidation in a suitable gas atmosphere and subsequent reduction, by electrochemical anodic oxidation and subsequent reduction, by partial galvanic wearing-away of the surface layer or by partial wearing-away of the surface layer by treatment with carbon monoxide provided that the metal of the substrate is capable of forming a volatile carbonyl.

Another manner of producing a porous supporting skeleton layer is carried out by forming a porous electrolytic deposit of a supporting skeleton metal on the metal base and, if desired, by subsequently bonding this layer onto the metal base by sintering at a temperature in excess of 400° C. and preferably between 600 and 1100° C.

The Raney alloy is preferably incorporated, as for example, by beating, brushing or rolling under pressure into the porous supporting skeleton layer produced from the base metal itself or deposited thereon. The Raney alloy is then anchored therein by sintering and the resulting composite member is finally treated with caustic solutions or acids to remove the soluble components of the Raney alloy and thus achieve the double skeleton structure in accordance with the invention.

Irrespective of whether the pulverulent mixture of both the supporting skeleton material and the Raney alloy is intended to be applied to the metal base simultaneously by sintering or whether it is desired to first apply only the supporting skeleton layer to the metal base and thereafter the Raney alloy, it is advantageous for increasing the reactivity and the workable area of the surface to be bonded to first roughen the surface, as for example, by one of the above-mentioned methods suitable for imparting porosity to the metal.

It should be noted that the application of the pulverulent mixture of the supporting skeleton material and Raney alloy to the metal base, or of the pulverulent Raney alloy to be embedded into the finished supporting skeleton, when carried out by rolling or pressing prior to sintering, results in a more intimate contact between the components to be bonded together by sintering. Consequently, such rolling or pressing advantageously facilitates the sintering process.

In many cases, the pulverulent mixture of supporting skeleton metal and Raney alloy, or the powder of supporting skeleton material alone applied to the metal base followed by the Raney alloy to be incorporated into the porous and tightly adhering supporting skeleton layer, may be bonded to the solid substrate by pressing or rolling at temperatures above 300° C. and preferably at 400 to 600° C. The soluble components may be subsequently removed from the Raney alloy layer by treatment with a caustic solution or acid.

Where pulverulent supporting skeleton material is to be used, the particle diameter is advantageously between 1 and 200 microns and preferably between 10 and 50 microns. The particle diameter of the Raney alloy preferably should not exceed 0.5 times the pore diameter of the supporting skeleton layer.

Whether the attendant operations to be performed at elevated temperatures are carried out in a reducing, inert, or oxidizing atmosphere is substantially dependent upon the reactive tendency of that base metal of the components present which is readiest to oxidize. In general, however, a reducing atmosphere will be advantageous even if not necessary. The dissolving out of the alloying element of the Raney alloy in order to obtain the superficial double skeleton structure may be carried out by treatment with a caustic solution or acid. This operation, i.e. the dissolving out of the soluble constituents of the Raney alloy, can be aided in accordance with the process of the invention for activating catalysts containing Raney metal by anodic polarization of the formed body in an activating solution. This may be accomplished by maintaining the potential of the formed body constantly or at least temporarily 100 to 2000 mv. more positive than the potential of the reversible hydrogen electrode under atmospheric pressure in the same solution.

Of course, the number of combinations of the various metals for producing composite parts having a structure in accordance with the invention is very great. Suitable substrates include those metals mentioned above which are resistant to the activating solution. In particular, the process of the invention enables even cheap iron to be used as the metal base. The same is true for the supporting skeleton material provided that the same is resistant to the activating solution.

Suitable Raney metals include especially nickel, copper, silver, molybdenum, tungsten, platinum, palladium, and rhenium.

Examples of suitable activating additives for Raney nickel include copper, palladium, platinum, alumina, zinc oxide, lithium oxide, etc. Raney silver may be activated by chromium, manganese, vanadium, columbium, platinum, osmium, manganese oxide. Suitable activators for Raney copper include nickel and/or nickel oxide, while those for Raney molybdenum may be copper, nickel, tungsten and/or tungsten carbide. In addition to the foregoing materials, a great number of other materials are also suitable depending upon the use to which the particular composite member is to be put.

The metal base, the supporting skeleton and the Raney metal may all consist of the same metal, e.g. nickel, silver, copper, palladium and the like or alternatively, only the metallic substrate and supporting skeleton may be made of the same metal, for example, nickel, while silver or one of the other metals mentioned above may be used as the Raney metal. When using a base metal, e.g. iron, as the substrate, the base metal may be coated with a double skeleton layer, the structural elements of which may comprise the same or different metals.

The selection of the materials to be used for the skeleton and the Raney metal layer is dependent upon the particular use to which the composite member of the invention is to be put.

Shaped parts having the superficial double skeleton catalyst structure, in accordance with the invention, have various applications. Consequently, they may be used as catalysts in chemical reactions which were hitherto catalyzed by conventional Raney metal parts since they have the same catalytic properties as the Raney skeleton contained therein.

The composite members of the invention are particularly useful as electrodes for fuel cells, electrolyzers and in cells wherein electrochemical oxidation and reduction processes are carried out. For example, particular advantages are obtained when using them as anodes in fuel cells capable of electrochemical production of energy from liquid fuels dissolved in an electrolyte. As compared with corresponding conventional double skeleton catalyst electrodes, these composite members produced, in accordance with the invention, which may well be considered as economy double skeleton catalyst electrodes, especially exhibit the advantages of higher mechanical strength, workability without the need for cutting, and the employment of less material while maintaining the same degree of efficiency.

The following examples are given for a better understanding of the invention by way of illustration and not by way of limitation.

*Example 1*

A nickel foil of 0.1 mm. thickness was slightly etched with hydrochloric acid, washed and dried. Then, a pulverulent mixture of 50% by volume of carbonyl nickel and 50% by volume of Raney nickel alloy was spread on the foil. The Raney alloy consisted of 50% by weight each of nickel and aluminum and was composed of particles of a size of 3 to 5 microns. The foil with the powder spread thereon was pressed under a pressure of 1,000 kg./cm.$^2$ and sintered for 30 minutes in a reducing atmosphere at 850° C. Thereafter, the thickness of the sintered composite member was 0.2 to 0.3 mm. and that of the surface layer was 0.1 to 0.2 mm. The laminate was finally treated with a 6-normal caustic potash solution to dissolve out the aluminum. When used as a hydrogen-evolving electrode, the plate showed the usual low polarization of conventional double skeleton catalyst electrodes.

*Example 2*

A nickel foil of 0.1 mm. thickness was slightly etched with hydrochloric acid, washed and dried, and then coated with a thin layer of a pulverulent mixture of 5 parts by weight of carbonyl nickel and 1 part by weight of citric acid powder. The foil was sintered for 20 minutes in a hydrogen stream at 1050° C., coated again with the same mixture of powders and sintered again at 1050° C. In the highly porous coating thus formed, a Raney alloy (50% by weight Ni plus 50% by weight Al) of 3 to 5 microns particle size was incorporated by rubbing, bonded thereto by pressure rolling and sintered for 30 minutes in a hydrogen stream at 750° C. After leaching in 6-normal KOH, the resulting plate, when used as a hydrogen-evolving electrode, had equally good properties as the foil of Example 1 except that the adherence of the double skeleton catalyst layer to the substrate was even better than that in the case of Example 1.

*Example 3*

To a silver plate of 1 mm. thickness, the surface of which had been roughened by anodic oxidation in a concentrated caustic potash solution and subsequently reduced, a mixture of 50% by volume of a fine silver powder and 50% by volume of Raney silver alloy (65% by weight Ag plus 35% by weight Al) was applied by pressing at 550° C. using a pressure of 3,000 kg./cm.$^2$. Following this, the aluminum was dissolved out of the laminate with 6-normal KOH at a potential of +600 mv. with respect to the reversible $H_2$ electrode in the same solution. The laminate showed a low polarization when used as an oxygen-evolving electrode.

*Example 4*

A filter disc of stainless steel was covered with a power mixture of carbonyl nickel and citric acid (50:50 by volume) and sintered for 60 minutes at 1100° C., thereby producing a porous surface layer. A Raney alloy powder (Ni:Al=50:50 by weight) was incorporated into this layer by brushing, and bonded thereto by first pressing and then sintering at 750° C. in a hydrogen stream. After treatment with 6-normal KOH, the electrode was useable as a hydrogen diffusion electrode at current densities of more than 50 ma./cm.$^2$.

What is claimed is:

1. A process for producing an electrically conductive catalyst structure having a superficially thin catalyst surface which comprises applying to the surface of an electrically conductive substrate base an electrically conductive finely divided supporting skeleton material under mechanical pressure of 1000 to 3000 kg./cm.$^2$, sintering the resulting layer, embedding into said supporting skeleton layer a finely divided Raney alloy by mechanical pressure, sintering the resulting laminate, and treating the sintered laminate to dissolve out the soluble component of the Raney alloy.

2. A process according to claim 1 wherein a pore-forming material, volatile at the sintering temperature, is added to said supporting skeleton finely divided material before sintering.

3. A process according to claim 1 wherein said substrate base is subjected to a pore-forming step prior to the applying of said supporting skeleton material thereto.

4. A process for producing an electrically conductive catalyst structure having a superficially thin catalyst surface which comprises applying and tightly bonding to the surface of an electrically conductive substrate base an electrically conductive supporting skeleton layer and Raney alloy granules, and treating the resulting laminate to dissolve out the soluble component of the Raney alloy, said substrate base and said skeleton layer comprising the same metal, said skeleton layer being applied by forming a porous layer in said substrate base surface, and said Raney alloy granules being thereafter applied and tightly bonded, by sintering, to said porous layer.

5. A process according to claim 4 wherein said porous layer is formed by electrolytic deposit of the supporting skeleton layer metal onto the surface of said substrate base and said skeleton layer is thereafter bonded by sintering.

6. A process according to claim 4 wherein said granules are applied to said porous layer under mechanical pressure and the bonding of said granules is carried out at temperatures within the range of from about 300° to 1100° C.

7. A process according to claim 6 wherein the bonding of said granules is carried out in a reducing atmosphere.

8. A process according to claim 4 wherein said porous layer is formed by etching said substrate base surface.

9. A process according to claim 4 wherein said porous layer is formed by subjecting said substrate base surface to partial oxidation and subsequent reduction.

10. A process according to claim 4 wherein said porous layer is formed by subjecting said substrate base surface to partial galvanic erosion.

11. A process according to claim 4 wherein said porous layer is formed by subjecting said substrate base surface to partial erosion by treatment with carbon monoxide, said substrate base comprising a metal being capable of forming a volatile carbonyl.

12. A process according to claim 1 wherein said substrate base and said supporting skeleton material include at least one metal selected from the group consisting of Group 8 and Subgroups 1, 4, 5, 6 and 7 of the Periodic Table of Elements and alloys thereof.

13. A process according to claim 12 wherein said Raney alloy includes as Raney catalyst component thereof a metal selected from the group consisting of Group 8 and Subgroups 1, 4, 5, 6 and 7 of the Periodic Table of Elements.

14. A process according to claim 13 wherein said Raney alloy also includes up to 50% of the Raney catalyst component thereof of an activating additive therefor of the group of metals, metal oxides and carbides.

15. A process according to claim 1 wherein said sintering is carried out at temperatures in excess of 300° C.

16. A process according to claim 15 wherein said Raney alloy is embedded under mechanical pressure of about 1000 to 3000 kg./cm.$^2$.

References Cited in the file of this patent

UNITED STATES PATENTS

| | | |
|---|---|---|
| 2,291,745 | Neely | Aug. 4, 1942 |
| 2,641,622 | Higgins et al. | June 9, 1953 |
| 2,681,375 | Vogt | June 15, 1954 |
| 2,845,346 | Scanbon et al. | July 29, 1958 |
| 2,855,296 | Koehring | Oct. 7, 1958 |
| 2,928,891 | Justi et al. | Mar. 15, 1960 |

UNITED STATES PATENT OFFICE
CERTIFICATE OF CORRECTION

Patent No. 3,150,011                                              September 22, 1964

August Winsel et al.

It is hereby certified that error appears in the above numbered patent requiring correction and that the said Letters Patent should read as corrected below.

Column 3, line 48, before "substance" insert -- organic --.

Signed and sealed this 9th day of February 1965.

(SEAL)
Attest:

ERNEST W. SWIDER                                            EDWARD J. BRENNER
Attesting Officer                                                Commissioner of Patents